United States Patent
Colom Ikuno et al.

(10) Patent No.: US 12,238,522 B2
(45) Date of Patent: Feb. 25, 2025

(54) OPERATING A USER EQUIPMENT WITHIN OR AS PART OF A TELECOMMUNICATIONS NETWORK

(71) Applicant: Deutsche Telekom AG, Bonn (DE)

(72) Inventors: Josep Colom Ikuno, Korneuburg (AT); Dieter Gludovacz, Trumau (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/690,341

(22) PCT Filed: Sep. 1, 2022

(86) PCT No.: PCT/EP2022/074281
§ 371 (c)(1),
(2) Date: Mar. 8, 2024

(87) PCT Pub. No.: WO2023/036676
PCT Pub. Date: Mar. 16, 2023

(65) Prior Publication Data
US 2024/0276222 A1    Aug. 15, 2024

(30) Foreign Application Priority Data
Sep. 10, 2021 (EP) .................................. 21195884

(51) Int. Cl.
*H04W 12/08* (2021.01)
*H04W 12/069* (2021.01)
*H04W 12/30* (2021.01)

(52) U.S. Cl.
CPC ......... *H04W 12/08* (2013.01); *H04W 12/069* (2021.01); *H04W 12/35* (2021.01)

(58) Field of Classification Search
CPC .... H04W 12/08; H04W 12/069; H04W 12/35
See application file for complete search history.

(56) References Cited

U.S. PATENT DOCUMENTS

2017/0257791 A1    9/2017  Rajadurai et al.
2019/0261167 A1*   8/2019  Zhang ................. H04W 12/106
(Continued)

FOREIGN PATENT DOCUMENTS

CN    106998551 A    8/2017
CN    118524396 A    8/2024
(Continued)

OTHER PUBLICATIONS

3GPP "3rd Generation Partnership Project; Technical Specification Group Services and System Aspects; Study on 5G media streaming extensions (Release 17)", Aug. 27, 2021 (Aug. 27, 2021), pp. 1-100, 3GPP Draft; S4-211240, Mobile Competence Centre; 650, Route Des Lucioles; F-06921 Sophia-Antipolis Cedex; France, Retrieved from the Internet: URL: https://ftp.3gpp.org/tsg_sa/WG4_CODEC/TSGS4_115-e/Docs/S4-211240.zip, XP052064468 [retrieved on Aug. 27, 2021].

(Continued)

*Primary Examiner* — Khoi V Le
(74) *Attorney, Agent, or Firm* — LEYDIG, VOIT & MAYER, LTD.

(57) ABSTRACT

A method for operating a user equipment within or as part of a telecommunications network includes: in a first step, an application or an application layer functionality transmits an application access request message to an application authorization function or functionality, the application access request message comprising at least one piece of credential information being related to the application or the application layer functionality; and in a second step, the application
(Continued)

authorization function or functionality transmits—in case that the application access request message is determined, by the application authorization function or functionality, to be valid—an application access grant message to the application or the application layer functionality, such that access of the application or the application layer functionality to the at least one data transmission session is allowed only in case the application access request message is determined to be valid.

12 Claims, 2 Drawing Sheets

(56) References Cited

U.S. PATENT DOCUMENTS

| | | | |
|---|---|---|---|
| 2020/0267223 A1 | 8/2020 | Baek et al. | |
| 2021/0204207 A1* | 7/2021 | Fiorese | H04L 67/146 |
| 2022/0345887 A1* | 10/2022 | Karampatsis | H04W 8/18 |

FOREIGN PATENT DOCUMENTS

| | | |
|---|---|---|
| WO | WO 2020163760 A2 | 8/2020 |
| WO | 2021069067 A1 | 4/2021 |

OTHER PUBLICATIONS

Qualcomm Incorporated, "Considerations on Per-Application Authorization", No. Online; Aug. 18, 2021-Aug. 28, 2021, Aug. 17, 2021 (Aug. 17, 2021), pp. 1-2, 3GPP Draft; S4-211080, 3rd Generation Partnership Project (3GPP), Mobile Competence Centre; 650, Route Des Lucioles; F-06921 Sophia-Antipolis Cedex; France, Retrieved from the Internet: URL: https://ftp.3gpp.org/tsg_sa/WGA_CODEC/TSGS4_115-e/Docs/S4-211080.zip, XP052064308 [retrieved on Aug. 17, 2021].

3GPP TR 23.748 3rd Generation Partnership Project; Technical Specification Group Services and System Aspects; Study on enhancement of support for Edge Computing in 5G Core network (5GC), Release 17, Nov. 27, 2020, pp. 1-264, V1.2.0, 650 Route des Lucioles, Sophia Antipolis Valbonne, France, http://www.3gpp.org.

* cited by examiner

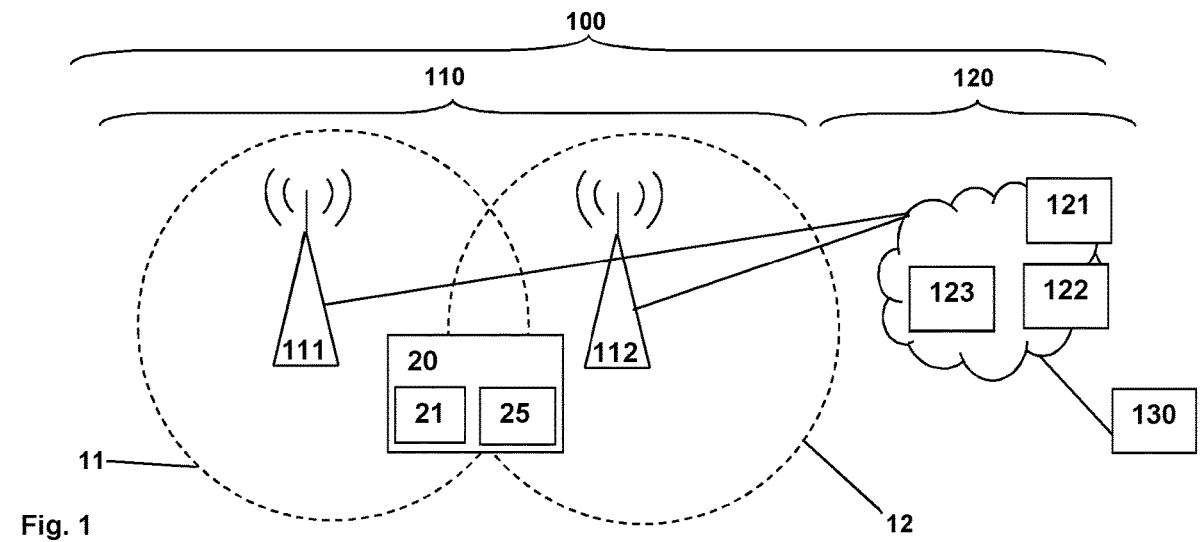
Fig. 1
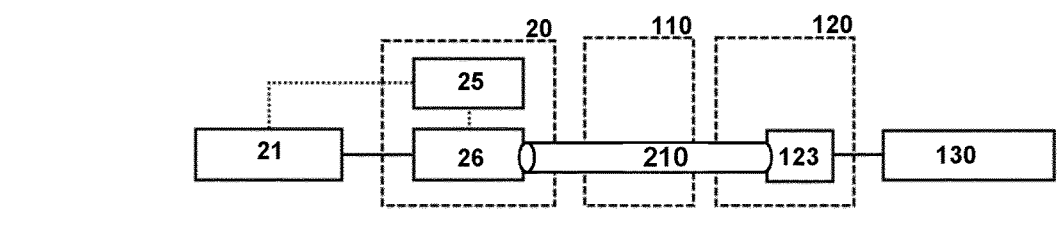
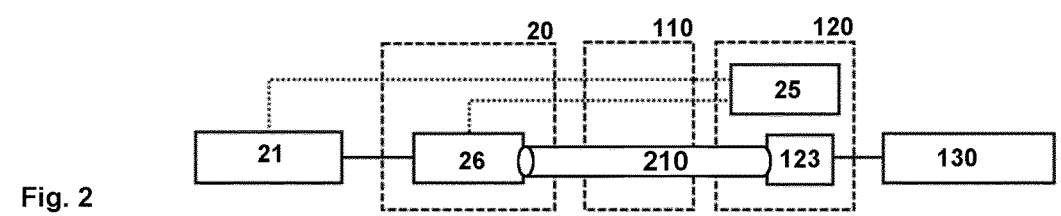
Fig. 2
Fig. 3

OPERATING A USER EQUIPMENT WITHIN OR AS PART OF A TELECOMMUNICATIONS NETWORK

CROSS-REFERENCE TO PRIOR APPLICATIONS

This application is a U.S. National Phase application under 35 U.S.C. § 371 of International Application No. PCT/EP2022/074281, filed on Sep. 1, 2022, and claims benefit to European Patent Application No. EP 21195884.8, filed on Sep. 10, 2021. The International Application was published in English on Mar. 16, 2023 as WO 2023/036676 A1 under PCT Article 21(2).

FIELD

The present invention relates a method for operating a user equipment within or as part of a telecommunications network, wherein the operation of the user equipment involves the operation of an application or an application layer functionality of the user equipment, wherein the operation of the application or of the application layer functionality of the user equipment requires at least one data transmission session to be established between the user equipment and the core network in order for the application or the application layer functionality to exchange payload data with or to be connected to the core network and/or the data network, using the at least one data transmission session.

Furthermore, the present invention relates to a user equipment for being operated within or as part of a telecommunications network, wherein the operation of the user equipment involves the operation of an application or an application layer functionality of the user equipment, wherein the operation of the application or of the application layer functionality of the user equipment requires at least one data transmission session to be established between the user equipment and the core network in order for the application or the application layer functionality to exchange payload data with or to be connected to the core network and/or the data network, using the at least one data transmission session.

Additionally, the present invention relates to a system or telecommunications network for operating a user equipment within or as part of the telecommunications network, wherein the operation of the user equipment involves the operation of an application or an application layer functionality of the user equipment, wherein the operation of the application or of the application layer functionality of the user equipment requires at least one data transmission session to be established between the user equipment and the core network in order for the application or the application layer functionality to exchange payload data with or to be connected to the core network and/or the data network, using the at least one data transmission session Additionally, the present invention relates to an application authorization function or functionality of a system or telecommunications network according to the present invention.

Furthermore, the present invention relates to a program and to a computer-readable medium according to a method for operating a user equipment within or as part of the telecommunications network in accordance with an embodiment of the invention.

BACKGROUND

In conventionally known telecommunications networks, there is typically a differentiation between an access network (AN), and a core network (CN). A user equipment is part of such telecommunications networks or connected thereto. Especially with mobile communication networks, the access network is a radio access network. In case of a mobile communication network, the user equipment communicates with the radio access network via a radio interface, which is used for conveying both signaling information and (payload) data traffic. Even if there is a logical separation (e.g. in the form of logical channels such as the N1/N2 vs. the N3 interfaces in case of a telecommunications network according to the 5G standard), both types of data end up being transmitted over the same physical medium. An analogous situation (of conveying both signaling information and (payload) data traffic over the same physical medium, e.g. a digital subscriber line) also applies in case of fixed-line telecommunications networks. However, in many circumstances, what is aimed at is that the user equipment is connected to a data network; this requires a data transmission session, e.g. in the form of a protocol data unit (PDU) session in case of a telecommunications network according to the 5G standard.

A data transmission session (or PDU session) is a logical data transport channel terminated at the core network that provides connectivity to a data network; the data transmission session (or PDU session) typically has a termination point, e.g. a user plane function (UPF) in case of a telecommunications network according to the 5G standard, that is also termed data transmission session anchor (or PDU session anchor). While a user equipment moves (e.g. via realizing handover operations within a mobile communication network, especially a radio access network), the data transmission session anchor typically remains constant (hence the term "anchor").

Presently, different applications (or application layer functionalities) realized in or by a user equipment are typically able to interact with the telecommunications network or parts or entities thereof or parts or entities connected thereto, such as, typically, the data network. However, the possibilities or capabilities of such applications (e.g. regarding which access is available to which service and under which conditions) conventionally depend on the subscription of the user equipment, and no access control (i.e. authorization) and authentication methods are available on a per-application granularity basis. There are ways to authenticate registration (of the user equipment) to a network, to a specific slice, and to a given PDU session, but not within a PDU session.

SUMMARY

In an exemplary embodiment, the present invention provides a method for operating a user equipment within or as part of a telecommunications network. The operation of the user equipment involves the operation of an application or an application layer functionality of the user equipment. The telecommunications network comprises or is associated or assigned to an access network and to a core network. The core network provides the user equipment with data connectivity towards a data network. The operation of the application or of the application layer functionality of the user equipment requires at least one data transmission session to be established between the user equipment and the core network. The at least one data transmission session is a protocol data unit (PDU) session. Either the user equipment or the core network comprises an application authorization function or functionality. The application authorization function or functionality authorizes the application or the application layer functionality to access the at least one data transmission session. In order for the application or the application layer functionality to exchange payload data with or to be connected to the core network and/or the data network, using the at least one data transmission session, the method includes the following steps: in a first step, the application or the application layer functionality transmits an application access request message to the application authorization function or functionality, the application access request message comprising at least one piece of credential information being related to the application or the application layer functionality; and in a second step, the application authorization function or functionality transmits—in case that the application access request message is determined, by the application authorization function or functionality, to be valid—an application access grant message to the application or the application layer functionality, such that access of the application or the application layer functionality to the at least one data transmission session is allowed only in case the application access request message is determined to be valid and wherein access is disallowed in case the application access request message is determined to be invalid. The user equipment comprises a session access control function or functionality which polices access of the application or application layer functionality to the at least one data transmission session according to the decision of the application authorization function or functionality.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically illustrates a telecommunications network comprising an access network, a core network and a user equipment, wherein a data network is either part of the telecommunications network or connected to or accessible by the telecommunications network, wherein the user equipment comprises or provides an application authorization function or functionality for authorizing an application or an application layer functionality of the user equipment to access a data transmission session of the user equipment with the core network with or towards the data network.

FIG. 2 schematically illustrates the user equipment, an application or application layer functionality of the user equipment, the access network, the core network and the data network according to the present invention, wherein two possible implementations according to the present invention are represented regarding the localization or association of the application authorization function or functionality.

FIGS. 3 to 5 schematically illustrate communication diagrams between the application, the user equipment, the core network and the data network according to the present invention.

DETAILED DESCRIPTION

Figure 4:
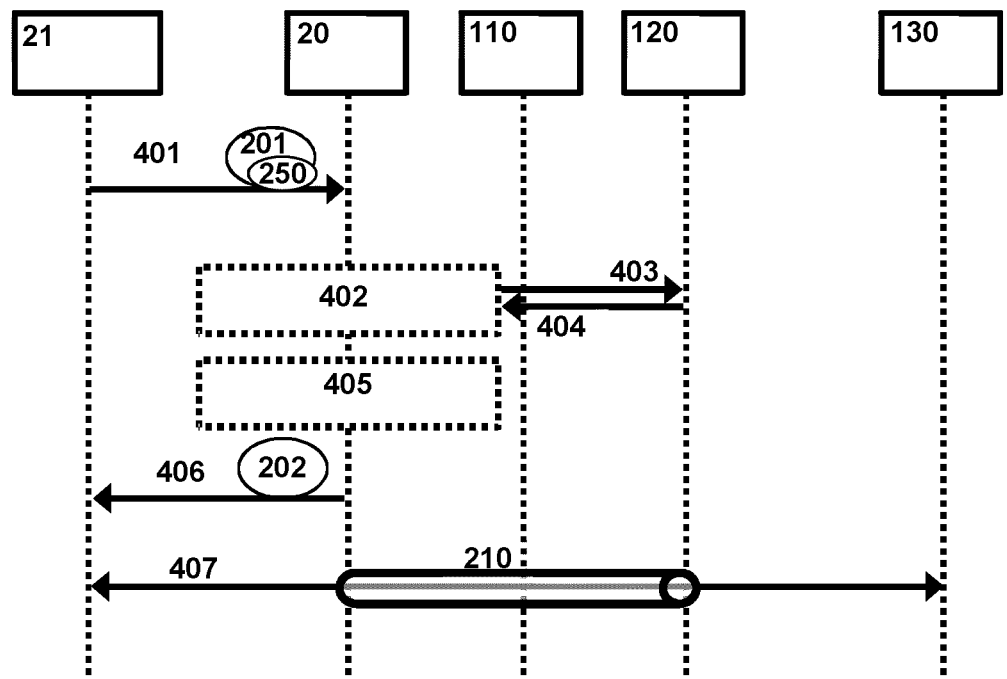

Exemplary embodiments of the present invention provide a technically simple, effective and cost effective solution for operating a user equipment within or as part of a telecommunications network, wherein the operation of the user equipment involves the operation of an application or an application layer functionality of the user equipment, and wherein the access of the application or the application layer functionality to a data transmission session (to at least one data transmission session) is able to be controlled and policed in an application-specific manner. Further exemplary embodiments of the present invention provide a corresponding user equipment, system or mobile communication network, application authorization function or functionality, and a corresponding program and computer-readable medium.

In an exemplary embodiment, the present invention provides a method for operating a user equipment within or as part of a telecommunications network, wherein the operation of the user equipment involves the operation of an application or an application layer functionality of the user equipment, wherein the telecommunications network comprises or is associated or assigned to an access network and to a core network, wherein the core network provides the user equipment with data connectivity towards a data network, wherein the operation of the application or of the application layer functionality of the user equipment requires at least one data transmission session to be established between the user equipment and the core network, wherein the user equipment comprises or is assigned to or is able to access an application authorization function or functionality, wherein the application authorization function or functionality authorizes the application or the application layer functionality to access the at least one data transmission session, wherein, in order for the application or the application layer functionality to exchange payload data with or to be connected to the core network and/or the data network, using the at least one data transmission session, the method comprises the following steps:

in a first step, the application or the application layer functionality transmits an application access request message to the application authorization function or functionality, the application access request message comprising at least one piece of credential information being related to the application or the application layer functionality, in a second step, the application authorization function or functionality transmits—in case that the application access request message is determined, by the application authorization function or functionality, to be valid—an application access grant message to the application or the application layer functionality.

It is thereby advantageously possible according to the present invention that via the application or the application layer functionality requesting and the application authorization function or functionality providing access to the data transmission session (i.e. the application or the application layer functionality transmitting an application access request message (comprising at least one piece of credential information being related to the application or the application layer functionality) to the application authorization function or functionality, and the application authorization function or functionality transmitting (in case that the application access request message is determined, by the application authorization function or functionality, to be valid) an application access grant message to the application or the application layer functionality), it is possible for the application or the application layer functionality to exchange payload data with or to be connected to the core network and/or the data network, using the (at least one) data transmission session, in an application-specific manner.

Connected to this, it is advantageously possible to provide differentiated services related to how and where such services are deployed in the telecommunications network, e.g. edge services, low-latency services, specific features, etc., and who has access to which services, i.e. which services are allowed for a given subscription (of a user equipment) and/or for which applications or application layer functionalities under which conditions.

Conventionally, the scope of a mobile network (or, more generalized, of a telecommunications network) comprises of is composed of the user equipment, the access network, the core network, and one or a plurality of data networks. Conventionally, it is implied that access, service and subscription information relates to a user equipment subscription, and that there is, conventionally, no way to use access control/authorization and authentication methods on a per-application granularity basis. There are typically ways to authenticate registration to a network, to a specific slice, and to the establishment of a given PDU session, but not within a PDU session.

According to the present invention, it is advantageously possible, e.g., to limit access to specific network slices to certain applications, to charge in an application specific manner, especially application-specific traffic based on application flows, and, more generally speaking, to be able to control the access to data connectivity on a per-application basis instead of (or additionally to) on a per-subscriber basis. Hence according to the present invention, it is advantageously possible that network operators have the possibility to offer connectivity not (only) to specific subscribers (e.g. a physical customer or a user equipment), but rather to applications, i.e. in an application-specific manner. This means that which services a given user equipment is able to access is not only dictated by the subscription data of that given user equipment (or to which this user equipment is related to) but rather by the "application subscription data" (i.e. via the application or the application layer functionality requesting and the application authorization function or functionality providing access to the data transmission session).

In order to establish a data connection enabling the user equipment (or any user equipment) to communicate with a data network, a data transmission session (especially a PDU session) is required. A data transmission session (or PDU session) is a logical data transport channel, typically terminated at the core network, that provides connectivity to a data network. The termination point of a given data transmission session (or PDU session)—typically a user plane function in the context of a 5G telecommunications network)—is termed data transmission session anchor (or PDU session anchor, PSA, especially in 5G). While a user equipment moves (e.g. in case of handover), the data transmission session anchor typically remains rather constant. A data transmission session (or PDU session) is established between the user equipment and the core network as follows, i.e. according to the following processing steps:

The user equipment sends a session establishment request (i.e. a corresponding message) to the core network; the data transmission session is established by the core network; the core network sends a data transmission session establishment accept (i.e. a corresponding message) to the user equipment; as a result of these processing steps, the user equipment, and especially an application or an application layer functionality within or as part of the user equipment, is able to send data traffic to the data network (accessible by or via the core network) and/or to receive data traffic from the data network, using the data transmission session or PDU session.

According to the present invention, the user equipment comprises or is assigned to or is able to access an application authorization function or functionality, wherein the application authorization function or functionality authorizes the application or the application layer functionality to access the considered data transmission session or a plurality of considered data transmission sessions (i.e. the least one data transmission session). The exchange of payload data (or data traffic), or the connectivity, between the application or the application layer functionality, on the one hand, and the core network and/or the data network, on the other hand, requires the at least one data transmission session.

The telecommunications network typically comprises an access network and a core network. However, the present invention is also related to situations where the telecommunications network does not comprise, strictly speaking, both an access network and a core network, but where the telecommunications network is only associated or assigned to an access network (and especially comprises the core network), or where the telecommunications network is only associated or assigned to a core network (and especially comprise the access network), or where the telecommunications network is only associated or assigned to both an access network and a core network. According to the present invention, the core network especially provides the user equipment with data connectivity towards a data network, hence the core network, at least partly, realizes 5G functionality.

According to the present invention, it is advantageously possible to realize that an application might be required to request to access or to use (for its data traffic or payload data to be transmitted to and from the data network) a or the considered data transmission session (via transmitting the application access request message to the application authorization function or functionality). Only in case that this request is granted (via the application access grant message transmitted to (and received by) the application or the application layer functionality), the application or application layer functionality is able (or allowed) to access the data transmission session, and, of course, this grant could also be denied by the application authorization function or functionality (in case that the application access request message is determined, by the application authorization function or functionality, to be invalid).

According to the present invention, it is furthermore advantageously possible and preferred that the operation of the user equipment furthermore involves the operation of a further application or a further application layer functionality of the user equipment, wherein the operation of the further application or of the further application layer functionality of the user equipment also uses the at least one data transmission session established between the user equipment and the core network.

wherein, in order for the further application or the further application layer functionality to exchange payload data with or to be connected to the core network and/or the data network, using the at least one data transmission session: the further application or the further application layer functionality transmits a further application access request message to the application authorization function or functionality, the further application access request message comprising at least one piece of further credential information being related to the further application or the further application layer functionality, and the application authorization function or functionality transmits—in case that the further application access request message is determined, by the application authorization function or functionality, to be valid—a further application access grant message to the further application or the further application layer functionality.

It is thereby advantageously possible according to the present invention that the access, to the data transmission session (or to different data transmission sessions), is conditional on both the application (and/or the application layer functionality) and the further application (and/or the further application layer functionality) requesting this access by using their specific at least one piece of credential information (i.e. the at least one piece of credential information in case of the application or application layer functionality, and the at least one piece of further credential information in case of the further application or further application layer functionality)—hence, the grant of this access to the data transmission session (or the plurality of data transmission sessions) is application-specific according to the present invention.

According to the present invention, it is furthermore advantageously possible and preferred that the at least one piece of credential information is or corresponds or comprises a certificate or certificate information and/or a token information.

Thereby, embodiments of the invention are able to be comparatively easily realized using conventionally known types of credential information or pieces of credential information such as, e.g., certificates and/or tokens, as well as pieces of information derived thereof.

It is furthermore advantageously possible and preferred that the application access request message, the at least one piece of credential information, and the application access grant message are application-specific or application group-specific, respectively.

Thereby, it is advantageously possible to enhance, e.g., the level of security by using (between different applications or application layer functionalities, or between different groups of applications or different groups of application layer functionalities) different application access request messages, different pieces of credential information, and different application access grant messages that are specific to the respective application (or application layer functionality) or group thereof.

Furthermore, it is advantageously possible and preferred according to the present invention that the credential information relates to two or more applications or application layer functionalities, especially to a group of applications or application layer functionalities.

Thereby, it is advantageously possible that—in case the access to a data transmission session has already been requested and provided or granted to a first application or first application layer functionality (of the considered group of applications or group of application layer functionalities)—a second application or second application layer functionality (of the considered group of applications or group of application layer functionalities) is able to use the granted access to the respective data transmission session directly.

Furthermore, it is advantageously possible and preferred according to the present invention that at least one piece of credential information is valid for two or more data transmission sessions.

Thereby, it is advantageously possible that an application or application layer functionality that has already been granted to access a first data transmission session is able to also access a second data transmission session (without necessarily being required to again request that access with respect to the second data transmission session).

Furthermore, it is advantageously possible and preferred according to the present invention that, in a third step subsequent to the second step, the application or the application layer functionality of the user equipment uses the at least one data transmission session to exchange payload data with or to transmit payload data to and/or receive payload data from the core network and/or the data network.

Furthermore, it is advantageously possible and preferred according to the present invention that the at least one data transmission session is a PDU session (protocol data unit session).

Furthermore, it is advantageously possible and preferred according to the present invention that, in a fourth step subsequent to the first step and prior to the second step, the application authorization function or functionality queries the core network, especially an authorization server function thereof, regarding the at least one piece of credential information, especially in order to determine whether the application access request message is valid or not.

Thereby, it is advantageously possible that the validity of the application access request message is able to be checked or verified centrally, e.g. by the authorization server function of the core network.

According to a further preferred embodiment of the present invention, the fourth step involves, after the PDU session having been established or generated, the user equipment exchanging PDU session modification messages with the core network, especially the authorization server function thereof,
  wherein especially the establishment or generation or subsequent modification of the PDU session comprises an indication of a capability related to the handling of application access request messages and application access grant messages and/or an indication of the necessity to use or handle application access request messages and application access grant messages.

Via the user equipment exchanging PDU session modification messages with the core network, especially the authorization server function thereof, it is advantageously possible that the benefits of embodiments of the invention are able to be realized comparatively easily by using an established mechanism or manner to modify the data transmission session or the PDU session.

Via using the indication of a capability (related to the handling of application access request messages and application access grant messages) and/or the indication of the necessity (to use or handle application access request messages and application access grant messages) it is advantageously possible—especially either during the fourth step, or during a fifth step prior to the first step—to modify the data transmission session or the PDU session such that a mechanism in accordance with an embodiment of the invention is possible and/or even required, especially required for a certain application or application layer functionality or for a certain (specifically defined) group of applications or application layer functionalities or for a certain class of applications or application layer functionalities.

Furthermore, it is advantageously possible and preferred according to the present invention that during the fourth step, the application authorization function or functionality queries or retrieves application flow information—related to the at least one piece of credential information or related to the application or to the application layer functionality or to the group of applications or the group of application layer functionalities—from the core network, especially from a session management function thereof.

wherein especially, the application flow information is used to indicate, within the data transmission session, payload data related to the application credentials (or application group credentials) while the application or the application layer functionality of the user equipment uses the at least one data transmission session to exchange payload data with or to transmit payload data to and/or receive payload data from the core network and/or the data network.

It is thereby advantageously possible, according to the present invention, to label—within the data transmission session, i.e. typically within the PDU session—the payload data (or data traffic) of the respective application or application layer functionality (or of the respective group of applications or group of application layer functionalities).

Furthermore, the present invention relates to a user equipment for being operated within or as part of a telecommunications network, wherein the operation of the user equipment involves the operation of an application or an application layer functionality of the user equipment, wherein the user equipment is configured to communicate with or as part of the telecommunications network and with an access network and a core network thereof, wherein the core network provides the user equipment with data connectivity towards a data network, wherein the operation of the application or of the application layer functionality of the user equipment requires at least one data transmission session to be established between the user equipment and the core network, wherein the user equipment comprises or is assigned to or is able to access an application authorization function or functionality, wherein the application authorization function or functionality authorizes the application or the application layer functionality to access the at least one data transmission session, wherein, in order for the application or the application layer functionality to exchange payload data with or to be connected to the core network and/or the data network, using the at least one data transmission session, the user equipment is configured such that:

the application or the application layer functionality transmits an application access request message to the application authorization function or functionality, the application access request message comprising at least one piece of credential information being related to the application or the application layer functionality, an application access grant message is received by the application or the application layer functionality—in case that the application access request message is determined, by the application authorization function or functionality, to be valid—from the application authorization function or functionality.

Furthermore, the present invention relates to a system or telecommunications network for operating a user equipment within or as part of the telecommunications network, wherein the operation of the user equipment involves the operation of an application or an application layer functionality of the user equipment, wherein the telecommunications network comprises or is associated or assigned to an access network and to a core network, wherein the core network provides the user equipment with data connectivity towards a data network, wherein the operation of the application or of the application layer functionality of the user equipment requires at least one data transmission session to be established between the user equipment and the core network, wherein the user equipment comprises or is assigned to or is able to access an application authorization function or functionality, wherein the application authorization function or functionality authorizes the application or the application layer functionality to access the at least one data transmission session, wherein, in order for the application or the application layer functionality to exchange payload data with or to be connected to the core network and/or the data network, using the at least one data transmission session, the system or telecommunications network is configured such that:

an application access request message is received by the application authorization function or functionality from the application or the application layer functionality, the application access request message comprising at least one piece of credential information being related to the application or the application layer functionality, the application authorization function or functionality transmits—in case that the application access request message is determined, by the application authorization function or functionality, to be valid—an application access grant message to the application or the application layer functionality.

Still additionally, the present invention relates to an application authorization function or functionality of a system or a telecommunications network in accordance with embodiments of the invention.

Additionally, the present invention relates to a program comprising a computer readable program code and/or a computer-readable medium comprising instructions, which, when executed on a computer and/or on a user equipment and/or on an application authorization function or functionality and/or on a network node of a telecommunications network, or in part on a user equipment and/or in part on an application authorization function or functionality and/or in part on a network node of a telecommunications network, causes the computer and/or the user equipment and/or the application authorization function or functionality and/or the network node of the telecommunications network to perform a method in accordance with an embodiment of the invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 comprising an access network 110, and a core network 120 is schematically shown. The access network 110 comprises a plurality of radio cells 11, 12. Furthermore, the core network 120 is connected to a data network 130. The core network 120 provides the user equipment 20 with data connectivity towards the data network 130.

In the exemplary situation or scenario shown in FIG. 1, a first base station entity 111 generates or is associated with or spans the first radio cell 11, and a second base station entity 112 generates or is associated with or spans the second radio cell 12. A user equipment 20 is part of or connected to the telecommunications network 100 through an air interface (or radio interface) with one of the base station entities (in the example shown, either the first base station entity 111 or the second base station entity 112). The user equipment 20 has or comprises an application 21 or an application layer functionality 21, e.g. an installed app or other program or program module. Furthermore, the user equipment 20 comprises, in the exemplary embodiment shown in FIG. 1, an application authorization function or functionality 25 for authorizing the application 21 or the application layer functionality 21 to access a data transmission session that is not explicitly shown in FIG. 1.

The core network 120 comprises an authorization server function 121, a session management function 122, and a user plane function 123. The user equipment 20 is typically, but not necessarily, mobile i.e. able to move with respect to the (typically, but not necessarily static) radio cells 11, 12 or corresponding base station entities 111, 112 of the access network 110.

Generally in the context of the present invention, the authorization server function 121 provides an authorization functionality; especially in the context of a telecommunications network according to the 5G standard, such an authorization functionality might be provided by an access and mobility management function and/or by an authentication server function and/or by a unified data management: The authentication server function (AUSF) typically provides the authentication functionality, the unified data management (UDM) has the authorization data, and the access and mobility management function (AMF) typically provides the actual authorization in dependency of these data.

According to the present invention—as in conventionally known telecommunications networks—, a data transmission session (or PDU session) is established, logically, between the user equipment 20 and the core network 120 (although, of course, the access network 110 is involved as well) and has an associated (or defined) quality-of-service level, i.e. several quality-of-service flows are able to be contained within the data transmission session.

In FIG. 2, two representations or implementations, according to the present invention, are shown. Both representations or implementations show an application 21 or application layer functionality 21 of the user equipment 20, the user equipment 20, the access network 110, the core network 120 and the data network 130. Between the user equipment 20 and the core network 120, a PDU session or data transmission session 210 is schematically shown. The PDU session or data transmission session 210 is terminated (or anchored), in the core network 120, via a session anchor 123, or PDU session anchor 123, especially a user plane function 123 of the core network (especially in case of a 5G telecommunications network 100). The two implementations according to the present invention are primarily related to the localization or association of the application authorization function or functionality 25—either with the application authorization function or functionality 25 integrated in or co-located with the user equipment 20, shown in the upper representation of FIG. 2, or with the application authorization function or functionality 25 integrated in or co-located with the core network 120, shown in the lower representation of FIG. 2. In both representations or implementations, the application authorization function or functionality 25 is exemplarily shown with a session access control function or functionality 26. The session access control function or functionality 26 is especially provided for policing the decision of the application authorization function or functionality 25, and especially triggers the downlink data packets and the uplink data packets to be marked or labelled.

Even though the application 21 or the application layer functionality 21 is represented, in FIG. 2 (and also in FIGS. 3 to 5), dissociated from the user equipment 20, it is to be understood that the application 21 or the application layer functionality 21 is implemented or integrated in the user equipment 20.

In case that two different applications 21 or application layer functionalities 21 (typically as part of the user equipment 20, i.e. installed (as, e.g., an app) on the user equipment 20 or natively part of the user equipment 20, e.g. as a part of its operating system) both use a given PDU session or data transmission session 210, it is advantageously possible, according to the present invention, to:

limit access to such a PDU session or data transmission session 210 on a per-application basis and/or to mark or to label the downlink data packets and/or the uplink data packets, likewise on a per-application basis.

This is both not possible in conventionally known telecommunications networks.

In conventionally known telecommunications networks, credentials are used or are able to be used for:

(the user equipment) getting or being provided access to the network or telecommunications network and/or access to a given network slice and/or the establishment of a data transmission session (or PDU session).

This means, using mainly 5G nomenclature, that regarding access to the network (especially in case of a public land mobile network), user equipment subscription data is used (which is typically stored in the user equipment's subscriber identity module, especially USIM) to register in the network via the access and mobility management function. Regarding access to a given (network) slice, a 5G network can require authentication and provide/reject authorization for access to specific (network) slice(s), especially in additionally to the credentials regarding access to the network. Especially for access to a given network slice and the establishment of a data transmission session (or PDU session), it is foreseen that an external credential server (especially outside of the core network) is able to be used.

Regarding access to the network, this is also possible (e.g. in case of 5G-based private networks, i.e. SNPNs), however it is not commonly used in public mobile networks (public land mobile networks), the credentials used for granting access to a public land mobile network are, as defined by 3GPP standards, stored in a USIM (either a physical UICC or in electronic form, e.g. eSIM) in the user equipment. Other types of credentials may be stored elsewhere but are ultimately used in the communication between the user equipment and the core network to grant access to, e.g., a given slice and/or as part of a data transmission session (or PDU session) establishment procedure.

Furthermore regarding conventionally known telecommunications networks, a common use of such PDU session authentication is when a PDU session is used for connecting to a private data network (comprising or having assigned a data network name (DNN)) for providing VPN-like data services, e.g. access to a corporate network, where the credentials used for PDU session establishment are not operator credentials but rather 3rd party credentials from, e.g. a company. As such, a specific PDU session might be used exclusively for a given data connection and authenticated via dedicated credentials.

The current typical use of PDU sessions in mobile communication networks (often telecommunications network according to the 4G standard), is that two PDU sessions are present at almost all (or most) times: a PDU session for internet access (especially used by applications such as, e.g., browser, video streaming, etc. for connectivity to the Internet) and a PDU session for IP multimedia subsystem (IMS) access (especially used by the phone dialer—typically bundled as part of the user equipment's operating system). The respective PDU session anchor (PSA, this role being mainly played by the user plane function in 5G networks) may be different for each PDU session, or, alternatively, shared by more than one PDU sessions. A typical case of enterprise use is that the corporate virtual private network (VPN) substitutes the Internet DNN, thus "internet access" is then provided by the VPN (i.e. the corporate network), thus resulting also in two PDU sessions.

Additionally in conventionally known telecommunications networks, it is possible that an application has access to a PDU session (e.g. for common Internet DNN access) and to a further one supporting specific services such as edge features, e.g. over a different network slice; such a (further). Such a further PDU session could potentially also be shared by several applications. Furthermore, it is possible in conventionally known telecommunications networks to have several PDU sessions providing connectivity to the same DNN (e.g. to provide "normal", high-bandwidth, best-effort via a PDU session and a separate PDU session realized, e.g., via a separate network slice, providing also ultra-reliable low-latency communication, URLLC, support and additional features but may be with limited bandwidth). Furthermore in conventionally known telecommunications networks, the PDU session conveys metadata, related to the traffic (or payload data packets) being transported, by marking transmitted data packets with identifiers. E.g., 3GPP TS 38.401 comprises the PDU session protocol stack, i.e. the protocol structure used for data being sent via PDU sessions, and 3GPP TS 38.415 shows how user plane packets (between the access network and the core network) are marked as belonging to a specific QoS flow (as part of the PDU session). Furthermore, within a GTP-U tunnel, a TEID mapping (tunnel endpoint identifiers) and a quality-of-service flow identifier is also used as metadata of a payload data packet and contains the traffic to a specific PDU session.

Furthermore, 3GPP TS 38.301 comprises the user plane stack between the user equipment and the access network (for the case of a telecommunications network according to the 5G standard, 5G-NR) showing how differentiated quality-of-service flows are mapped by the user equipment into the protocol stack that provides communication between the user equipment and the access network. On the reverse side (i.e. between the access network and the user equipment), the reverse process is performed: On the access network—user equipment interface, quality-of-service flows are separated; the quality-of-service flow handling step, as defined in 3GPP TS 37.324 conventionally works by adding an end-marker control PDU containing a QFI, which indicates the ID of the quality-of-service flow (3GPP TS 23.501) to which the SDAP PDU belongs. As defined in 3GPP TS 37.324. "End-Marker control PDU is used by the SDAP entity at UE to indicate that it stops the mapping of the SDAP SDU of the QoS flow indicated by the QFI/PQFI to the DRB/SL-DRB on which the End-Marker control PDU is transmitted".

According to the present invention, a method for operating a user equipment 20 within or as part of a telecommunications network 100 is provided. As is typically the case, the operation of the user equipment 20 involves the operation of an application 21 or an application layer functionality 21 of the user equipment 20. Such an application 21 or an application layer functionality 21 might especially be an installed app or application on the user equipment 20 or a of the user equipment's 20 operating system, i.e. natively part of the user equipment 20. As is usually the case, the telecommunications network 100 comprises or is associated or assigned to the access network 110 and to the core network 120, wherein the core network 120 provides the user equipment 20 with data connectivity towards the data network 130.

The operation of the application 21 or of the application layer functionality 21 of the user equipment 20 requires at least one data transmission session 210 to be established between the user equipment 20 and the core network 120 (via the access network 110). Often, in reality, a plurality of data transmission sessions are established between the user equipment 20) and the core network 120, normally via the access network 110. This is also known from conventional telecommunications networks. According to the present invention, the access (of an application 21 or an application layer functionality 21) to a considered data transmission session 210 is able to be granted or allowed on a per-application basis which is not possible in conventionally known telecommunications networks.

Thus, according to the present invention, the user equipment 20 comprises or is assigned to or is able to access an application authorization function or functionality 25. This application authorization function or functionality 25 authorizes the application 21 or the application layer functionality 21 to access the at least one (considered) data transmission session 210. In order for the application 21 or the application layer functionality 21 to exchange payload data with the core network 120 and/or the data network 130 (i.e. to send payload data to the core network 120 and/or to the data network 130 and/or to receive payload data from the core network 120 and/or from the data network 130, thus, to be connected to the core network 120 and/or the data network 130) using the at least one data transmission session 210, the method comprises the first and second steps, namely: In the first step, the application 21 or the application layer functionality 21 transmits an application access request message 201 to the application authorization function or functionality 25, the application access request message 201 comprising at least one piece of credential information 250 being related to the application 21 or the application layer functionality 21, and, in a second step, the application authorization function or functionality 25 transmits—in case that the application access request message 201 is determined, by the application authorization function or functionality 25, to be valid—an application access grant message 202 to the application 21 or the application layer functionality 21.

Hence, at least the application authorization function or functionality 25 according to the present invention is provided or present in the user equipment 20 (or accessible to the user equipment 20) in a telecommunications network 100 in accordance with an embodiment of the invention. The application authorization function or functionality realizes an application authorization function (AAF) that authorizes applications 21 (or application layer functionalities 21) so that they can access a given PDU session 210, i.e. the considered at least one data transmission session 210. Especially, furthermore also a session access control function or functionality 26 is provided or present in the user equipment 20 (or accessible to the user equipment 20) in a telecommunications network 100 in accordance with an embodiment of the invention. The session access control function or functionality 26 realizes a PDU session access control function (PDU-ACF) that polices the decision of the AAF and especially marks (or labels) traffic, especially payload traffic, accordingly.

According to specific embodiments of the present invention, especially the two cases are considered, namely the location of the AAF (or application authorization function or functionality) 25 within the user equipment 20 (cf. the upper part of FIG. 2) and the location of the AAF (or application authorization function or functionality) 25 within the core network 120 (cf. the lower part of FIG. 2). In both cases, the PDU-ACF (or session access control function or functionality) 26 is preferably placed within the user equipment 20 (it does police the access to a given PDU session or data transmission session 210, after all). However, it is preferred according to the present invention (as the PDU-ACF functionality (session access control function or functionality) 26 would typically be placed in the user equipment 20) to locate the AAF (application authorization function or functionality) 25 in the core network 120 is not as beneficial as placing it at the user equipment 20.

According to an embodiment of the present invention, it is, hence, preferred that both an application (or application layer functionality) 21 and a further application (or further application layer functionality) are operated. According to this embodiment, both the application 21 and the further application are able to use the at least one data transmission session 210, established between the user equipment 20 and the core network 120, via requesting access to it (to exchange payload data with or to be connected to the core network 120 and/or the data network 130) which access is requested via individual (or application-specific) application access request messages (to the application authorization function or functionality 25), wherein the application access request messages comprise, respectively, at least one piece of credential information (being related either to the application or to the further application).

In FIG. 3, a communication diagram is schematically shown between the application 21, the user equipment 20, the core network 120 and the data network 130 according to the present invention. In FIG. 3, it is supposed that the application authorization function or functionality 25 is part of the user equipment 20 and the session access control function or functionality 26 as well. Furthermore, the core network 120 comprises the authorization server function 121, the session management function 122, and the user plane function 123.

In a first processing step 301, the application 21 or application layer functionality 21 sends a request to access the data transmission session 210 (or PDU session 210) to the application authorization function or functionality 25; this request comprises or is identical to the application access request message 201 that in turn comprises at least one piece of credential information 250, i.e. the application credentials (being related to the application 21 or the application layer functionality 21). In a second processing step 302, the credential information is evaluated by the application authorization function or functionality 25. In a third processing step 303 and a fourth processing step 304, the application authorization function or functionality 25 queries the authorization server function 121 regarding the credential information received, and receives in return a result from the authorization server function 121. In a fifth processing step 305 and a sixth processing step 306, the application authorization function or functionality 25 queries and/or retrieves application flow information (related to the at least one piece of credential information 250) or related to the application 21 or to the application layer functionality 21 or to a group of applications 21 or group of application layer functionalities 21) from the session management function 122, and receives in return a result from the session management function 122. In a seventh processing step 307, the session management function 122 transmits the application flow information to the data transmission session anchor (or PDU session anchor, PSA, or user plane function) 123. In an eighth processing step 308, the application authorization function or functionality 25 sends a message to the session access control function or functionality 26 to setup the access of the respective (requesting) application 21 or application layer functionality 21 to or for the PDU session or data transmission session 210. In a ninth processing step 309, the application authorization function or functionality grants access (to the considered data transmission session or PDU session 210) to the application 21 or application layer functionality 21. In a tenth processing step 310 the application 21 or application layer functionality 21 sends (operationally) data (payload data packets) to the session access control function or functionality 26, and in an eleventh processing step 311 the session access control function or functionality 26 marks (or labels) data packets received from the application 21 or application layer functionality 21 so that, within the data transmission session or PDU session 210, it is possible to differentiate the different applications, i.e. the payload data transmitted using the data transmission session or PDU session 210 includes different application flows. In a twelfth processing step the session access control function or functionality 26 transmits the payload data (received, in the tenth processing step 310, from the application 21 or application layer functionality 21) to the core network 120, especially the user plane function 123, acting as data transmission session anchor (or PDU session anchor). In a thirteenth processing step 313, these data are forwarded, by the core network 120, especially the user plane function 123, to the data network 130.

Hence according to an embodiment of the present invention, according to which a PDU-ACF (or session access control function or functionality) 26 is present, the PDU-ACF (or session access control function or functionality) 26 is in charge of policing access to the PDU session or data transmission session 210 (e.g. when requesting a socket to the operating system of the user equipment 20, the application 21 or application layer functionality 21 needs to include credentials (at least one piece of credential information 250) and will only successfully be able to create the socket object if the access is granted by lower layers) and, hence, polices the access of the application 21 or application layer functionality 21 to the data transmission session or PDU session 210, and, additionally, it is possible to mark data flows within the respective PDU session 210 based on the originating application 21 or application layer functionality 21; hence, within the PDU session or the data transmission session 210, different application flows (of payload data related to different applications 21 or application layer functionalities 21 accessing the considered PDU session or data transmission session 210) are able to be differentiated (or a classification performed of these different data flows within the respective PDU session 210); according to the present invention, quality-of-service flows are additionally possible to be considered within the respective PDU session 210. Hence, according to the present invention, application-based (or application-specific) flow classification is able to be used complementarily to quality-of-service markings. The core network 120 is then able to use this information to (among other uses):

apply different prioritization/traffic policies to traffic from given applications 21 or application layer functionalities 21, apply different charging rules to different applications 21 or application layer functionalities 21, perform the above-mentioned functionality without the need to do or apply deep packet inspection (DPI) to the traffic.

In FIG. 4, a communication diagram is schematically shown between the application 21, the user equipment 20, the access network 110, the core network 120 and the data network 130 according to a preferred embodiment of the present invention. In FIG. 4, it is supposed that the application authorization function or functionality 25 is part of the user equipment 20. Especially, the session access control function or functionality 26 is as well part of the user equipment 20. Furthermore, the core network 120 especially comprises components or functions such as the authorization server function 121, the session management function 122, and the user plane function 123; however these functions or components are not specifically shown in FIG. 4.

Primarily, FIG. 4 shows an embodiment that is able to realize the application-based (or application-specific) access control (to the data transmission session or PDU session 21). In a first processing step 401, the application 21 or application layer functionality 21 sends the request to access the considered (or the at least one) data transmission session 210 (or PDU session 210) to the user equipment 20, especially to its application authorization function or functionality 25; this request comprises or is identical to the application access request message 201 (according to the first step of the method of the present invention) and comprises the at least one piece of credential information 250, i.e. the application credentials. This processing step of "Request to access PDU session 210 (or data transmission session 210)" is envisioned in its simplest form as an extension to OS APIs so that when a communications socket is initialized, the application credentials (or similar/analogous information like an authorization token) is added to the socket creation call. Internally, this socket call is mapped to a PDU session, e.g. to the "common Internet DNN PDU session", but in this case it would only return if the user equipment stack successfully performs the PDU session modification procedure. In a second processing step 402, the credential information is evaluated by the user equipment 20, especially by the application authorization function or functionality 25. In a third processing step 403 and a fourth processing step 404, the user equipment 20 (especially the application authorization function or functionality 25) queries the core network 120 (especially the authorization server function 121) and/or an entity (or another authorization server function) outside or external to the core network 120 regarding the credential information received, and receives in return a result from the authorization server function 121; in the latter case (i.e. in case that an entity external to the core network 120 is involved), the communication goes via the core network 120 towards the authorization server function 121. The third and fourth processing step 403, 404 especially correspond to or realize the fourth step (subsequent to the first step and prior to the second step) according to the method of the present invention, i.e. the application authorization function or functionality 25 or the user equipment 20 querying the core network 120 regarding the at least one piece of credential information 250, especially in order to determine whether the application access request message 201 is valid or not.

In a fifth processing step 405 the requested access of the application 21 or application layer functionality 21 to the considered PDU session or data transmission session 210 is set up by the user equipment 20, and in a sixth processing step 406, the access is granted via, according to the second step of the method according to the present invention, transmitting—by the user equipment 20—the application access grant message 202 to the application 21 or application layer functionality 21 (in case that the application access request message 201 is determined to be valid). Of course, in case the application access request message 201 is determined to be invalid (especially due to the at least one piece of credential information 250 being lacking or invalid or not corresponding to the application access request message 201 or to the requesting application 21 or application layer functionality 21) the access to the considered PDU session or data transmission session 210 is not granted. In a seventh processing step 407, payload data (i.e. data traffic) between the application 21 or application layer functionality 21 and the data network 130 through the data transmission session or PDU session 210 is (operationally) exchanged (corresponding to the third step (subsequent to the second step) according to a method in accordance with an embodiment of the present invention).

According to the present invention, it is furthermore preferred to implement the present invention via an extension to the PDU session modification to allow for an application-based authentication/authorization. This is schematically shown in FIG. 5 which shows, again, a communication diagram between the application 21, the user equipment 20, the access network 110, the core network 120 and the data network 130. Again in FIG. 5, it is supposed that the application authorization function or functionality 25 is part of the user equipment 20. Especially, the session access control function or functionality 26 is as well part of the user equipment 20. Furthermore, the core network 120 especially comprises components or functions such as the authorization server function 121, the session management function 122, and the user plane function 123; however these functions or components are not specifically shown in FIG. 5.

Figure 5:
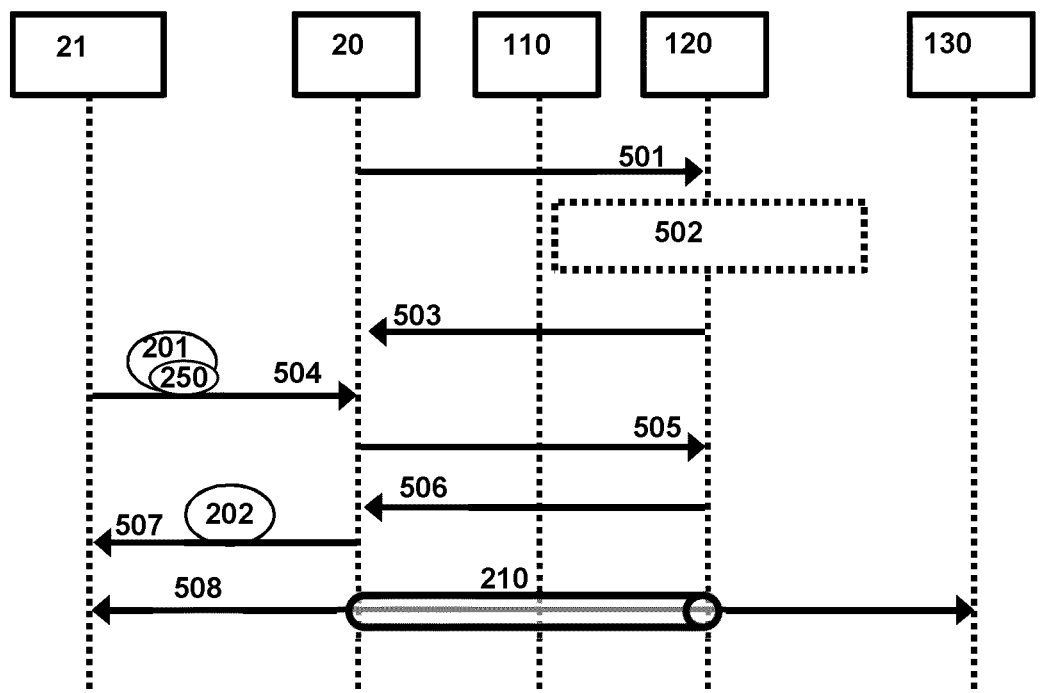

Primarily, FIG. 5 shows an embodiment of the present invention where the application-based authentication/authorization or access control (to the data transmission session or PDU session 21) is implemented via an extension to the PDU session modification.

In a first processing step 501, the user equipment 20 sends or transmits a PDU session establishment request (message) to the core network 120. In a second processing step 502, the core network 120 establishes the PDU session 210 (or the data transmission session 210). In a third processing step 503 the core network 120 sends or transmits a PDU session establishment accept (message) to the user equipment 20.

In a fourth processing step 504, the application 21 or application layer functionality 21 sends the request to access the considered (or the at least one) data transmission session 210 (or PDU session 210) to the user equipment 20, especially to its application authorization function or functionality 25; this request comprises or is identical to the application access request message 201 (according to the first step of the method of the present invention) and comprises the at least one piece of credential information 250, i.e. the application credentials. Again, this processing step is able to be realized via an extension to OS APIs, especially with adding the application credentials (or similar/analogous information like an authorization token or information derived from the application credentials) to the socket creation call. In a fifth processing step 505, a PDU session modification request (message), especially comprising the authorization information, i.e. the at least one piece of credential information 250, is transmitted, by the user equipment 20, to the core network 120. In a sixth processing step 506, a PDU session modification accept (message) (or 'PDU session modification accepted'), especially comprising an application access granted information, is transmitted, by the core network 120, to the user equipment 20. In a seventh processing step 507, the access grant is communicated with the application 21 or application layer functionality 21 via, according to the second step of the method according to the present invention, transmitting—by the user equipment 20—the application access grant message 202 to the application 21 or application layer functionality 21 (in case that the application access request message 201 is determined to be valid). In an eighth processing step 508, payload data (i.e. data traffic) between the application 21 or application layer functionality 21 and the data network 130 through the data transmission session or PDU session 210 is (operationally) exchanged (corresponding to the third step (subsequent to the second step) according to a method in accordance with an embodiment of the present invention).

According to preferred embodiments of the present invention, the application authorization function or functionality 25 queries or retrieves (especially during the fourth step of a method in accordance with an embodiment of the invention) application flow information—related to the at least one piece of credential information 250 or related to the application 21 or to the application layer functionality 21 or to the group of applications 21 or the group of application layer functionalities 21—from the core network 120, especially from a session management function 122 thereof. It is thereby especially possible to use the application flow information to indicate, within the data transmission session 210, payload data related to the application or application group credentials while the application 21 or the application layer functionality 21 of the user equipment 20 uses the at least one data transmission session 210 to exchange payload data with or to transmit payload data to and/or receive payload data from the core network 120 and/or the data network 130. Hence, via the application flow information, it is possible to distinguish different applications 21 or application layer functionalities 21 (or different groups of applications or different groups of application layer functionalities).

According to the present invention, it is preferred that an indication of additional capability is implemented, i.e. the indication that the PDU session supports application-based authentication and/or packet marking, and also regarding whether it is mandatory. Similarly, these capabilities can be added to the PDU establishment request (e.g. the user equipment 20) requests such capability to be present in the provided PDU session/data transmission session 210). Such indications are preferably transmitted, sent and/or received during the first and third processing steps 501, 503 according to FIG. 5, i.e. the PDU session establishment request (message) (first processing step 501) comprises additional capability indications or corresponding pieces of information indicative of such additional capabilities, and the PDU session establishment accept (message) (third processing step 503) comprises the indication or corresponding pieces of information indicative of such additional capabilities.

Furthermore, it is preferred according to the present invention that an awareness of the access network 110 is realized. In a 5G network, the radio access network 110 is aware of PDU sessions and of its related QoS flows. This information is used, e.g. by gNBs (i.e. base station entities) to steer scheduling. According to the present invention, by extending the PDU session framework to applications (or application layer functionalities of the user equipment), the radio access network 110 is preferably aware of the application flow information (especially in addition to being aware of the network slice used and/or the PDU session used and/or the quality-of-service level assigned to each data flow), and it is advantageously possible to use the application flow information to:

steer scheduling, and/or steer the activation of specific radio access network features on a per-application basis (e.g. L4S marking, for example for delay-critical applications), and/or based on application flow, the core network 120 is able to instruct the access network 110 to apply certain policies/features/mobility restrictions/priority/etc. to the traffic (payload data) regarding a certain application or a certain group of applications.

In certain embodiments of the present invention, it is furthermore preferred that the credential information 250) relates to two or more applications 21 or application layer functionalities 21, especially to a group of applications 21 or application layer functionalities 21. This means that such two or more applications 21 or application layer functionalities 21 share or use the same credential information. In addition to or alternatively, in certain embodiments of the present invention, it is also preferred that the at least one piece of credential information 250 is valid for two or more data transmission sessions 210—i.e. it is possible according to the present invention that (according to one extreme) an application 21 or an application layer functionality 21 has or uses a specific credential information 250) (different from the credential information other applications or application layer functionalities use) and/or that the application 21 or the application layer functionality 21 has or uses different pieces of credential information 250 for different data transmission sessions or PDU sessions 210; and (according to the other extreme) a plurality of applications 21 or a plurality of application layer functionalities 21 (or a group of applications 21 or a group of application layer functionalities 21) has or uses a common credential information 250) (but different from the credential information of other applications or application layer functionalities) and/or that the plurality of applications 21 or the plurality of application layer functionalities 21 have or use a common piece of credential information 250 for different data transmission sessions or PDU sessions 210.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a user equipment within or as part of a telecommunications network, comprising:
    transmitting, by an application or an application layer functionality of the user equipment, an application access request message to an application authorization function or functionality of the user equipment or of a core network of the telecommunications network, wherein the application access request message comprises at least one piece of credential information related to the application or the application layer functionality;
    determining, by the application authorization function or functionality, that the application access request message is valid, wherein access of the application or the application layer functionality to at least one data transmission session between the user equipment and the core network is to be allowed only in case the application access request message is determined to be valid, and wherein access is to be disallowed in case a respective application access request message is determined to be invalid; and
    based on determining that the application access request message is valid, transmitting, by the application authorization function or functionality, an application access grant message to the application or the application layer functionality; and
    accessing, by the application or the application layer functionality, the at least one data transmission session between the user equipment and the core network, wherein the core network provides the user equipment with data connectivity to a data network, and wherein the at least one data transmission session is a protocol data unit (PDU) session;
    wherein the user equipment comprises a session access control function or functionality which polices access of the application or application layer functionality to the at least one data transmission session according to a decision of the application authorization function or functionality.

2. The method according to claim 1,
wherein operation of a further application or of a further application layer functionality of the user equipment also uses the at least one data transmission session between the user equipment and the core network; and
wherein the method further comprises:
    transmitting, by the further application or the further application layer functionality, a further application access request message to the application authorization function or functionality, wherein the further application access request message comprises at least one piece of further credential information related to the further application or the further application layer functionality;
    determining, by the application authorization function or functionality, that the further application access request message is valid; and
    based on determining that the further application access request message is valid, transmitting, by the application authorization function or functionality, a further application access grant message to the further application or the further application layer functionality.

3. The method according to claim 1, wherein the at least one piece of credential information is or corresponds to or comprises a certificate or certificate information and/or token information; and/or
    wherein the application access request message, the at least one piece of credential information, and the application access grant message are respectively application-specific or application group-specific.

4. The method according to claim 1, wherein the credential information relates to two or more applications or application layer functionalities.

5. The method according to claim 1, wherein at least one piece of credential information is valid for two or more data transmission sessions.

6. The method according to claim 1, wherein the method further comprises:
    using, by the application or the application layer functionality of the user equipment, the at least one data transmission session to exchange payload data with or to transmit payload data to and/or receive payload data from the core network and/or the data network.

7. The method according to claim 1, wherein the method further comprises:
    querying, by the application authorization function or functionality, the core network regarding the at least one piece of credential information to determine whether the application access request message is valid or not.

8. The method according to claim 7, wherein the querying comprises, after the PDU session having been established or generated, the user equipment exchanging PDU session modification messages with the core network.

9. The method according to claim 7, wherein the querying comprises:
    querying or retrieving, by the application authorization function or functionality, application flow information-related to the at least one piece of credential information or related to the application or to the application layer functionality—from the core network.

10. A user equipment, comprising:
a processor; and
a non-transitory memory having processor-executable instructions stored thereon;
wherein the processor is configured to execute the processor-executable instructions to facilitate the following being performed by the user equipment:
transmitting, by an application or an application layer functionality of the user equipment, an application access request message to an application authorization function or functionality of the user equipment, wherein the application access request message comprises at least one piece of credential information related to the application or the application layer functionality;
determining, by the application authorization function or functionality, that the application access request message is valid, wherein access of the application or the application layer functionality to at least one data transmission session between the user equipment and the core network is to be allowed only in case the application access request message is determined to be valid, and wherein access is to be disallowed in case a respective application access request message is determined to be invalid;
based on determining that the application access request message is valid, transmitting, by the application authorization function or functionality, an application access grant message to the application or the application layer functionality; and
accessing, by the application or the application layer functionality, at least one data transmission session between the user equipment and a core network of a telecommunications network, wherein the core network provides the user equipment with data connectivity to a data network, and wherein the at least one data transmission session is a protocol data unit (PDU) session;
wherein the user equipment comprises a session access control function or functionality which polices access of the application or application layer functionality to the at least one data transmission session according to a decision of the application authorization function or functionality.

11. A telecommunications network device, comprising:
a processor; and
a non-transitory memory having processor-executable instructions stored thereon;
wherein the processor is configured to execute the processor-executable instructions to facilitate the following being performed by the telecommunications network device:
receiving, by an application authorization function or functionality of a core network of the telecommunications network, an application access request message from an application or an application layer functionality of a user equipment, wherein the application access request message comprises at least one piece of credential information related to the application or the application layer functionality;
determining, by the application authorization function or functionality, that the application access request message is valid, wherein access of the application or the application layer functionality to at least one data transmission session between the user equipment and the core network is to be allowed only in case the application access request message is determined to be valid, and wherein access is to be disallowed in case a respective application access request message is determined to be invalid;
based on determining that the application access request message is valid, transmitting, by the application authorization function or functionality, an application access grant message to the application or the application layer functionality; and
allowing the application or the application layer functionality to access at least one data transmission session between the user equipment and the core network, wherein the core network provides the user equipment with data connectivity to a data network, and wherein the at least one data transmission session is a protocol data unit (PDU) session;
wherein the user equipment comprises a session access control function or functionality which polices access of the application or application layer functionality to the at least one data transmission session according to a decision of the application authorization function or functionality.

12. One or more non-transitory computer-readable mediums having processor-executable instructions stored thereon for operating a user equipment within or as part of a telecommunications network, wherein the processor-executable instructions, when executed, facilitate:
transmitting, by an application or an application layer functionality of the user equipment, an application access request message to an application authorization function or functionality of the user equipment or of a core network of the telecommunications network, wherein the application access request message comprises at least one piece of credential information related to the application or the application layer functionality;
determining, by the application authorization function or functionality, that the application access request message is valid, wherein access of the application or the application layer functionality to at least one data transmission session between the user equipment and the core network is to be allowed only in case the application access request message is determined to be valid, and wherein access is to be disallowed in case a respective application access request message is determined to be invalid;
based on determining that the application access request message is valid, transmitting, by the application authorization function or functionality, an application access grant message to the application or the application layer functionality; and
accessing, by the application or the application layer functionality, at least one data transmission session between the user equipment and the core network, wherein the core network provides the user equipment with data connectivity to a data network, and wherein the at least one data transmission session is a protocol data unit (PDU) session;
wherein the user equipment comprises a session access control function or functionality which polices access of the application or application layer functionality to the at least one data transmission session according to a decision of the application authorization function or functionality.

\* \* \* \* \*